United States Patent

Hayashi

Patent Number: 5,580,329
Date of Patent: Dec. 3, 1996

[54] SUPERCHARGER CONTROL SYSTEM FOR ENGINES

[75] Inventor: Chikara Hayashi, Toyota, Japan

[73] Assignee: Toyota Jidosha Kabushiki Kaisha, Aichi-ken, Japan

[21] Appl. No.: 346,269

[22] Filed: Nov. 23, 1994

[30] Foreign Application Priority Data

Dec. 3, 1993 [JP] Japan ................................ 5-339428

[51] Int. Cl.$^6$ ............................................ F02D 23/00
[52] U.S. Cl. ........................ 477/33; 477/166; 123/559.3
[58] Field of Search ................. 477/33, 166; 60/601, 60/602; 123/559.3, 564

[56] References Cited

U.S. PATENT DOCUMENTS

| | | | |
|---|---|---|---|
| 5,050,452 | 9/1991 | Morioka | 477/33 |
| 5,090,391 | 2/1992 | Sasaki et al. | 123/559.3 |
| 5,133,228 | 7/1992 | Takata et al. | 977/33 |
| 5,205,191 | 4/1993 | Takata et al. | 477/33 |
| 5,307,783 | 5/1994 | Satoya et al. | 123/559.3 |

Primary Examiner—Carl D. Friedman
Assistant Examiner—Creighton Smith
Attorney, Agent, or Firm—Oliff & Berridge

[57] ABSTRACT

A supercharger control system for use with an automatic transmission connected to an internal combustion engine and having its gear stages set according to a throttle opening or its corresponding data and an engine R.P.M. or its corresponding data. The range for turning ON the supercharger of the engine is set for each of the gear stages on the basis of the throttle opening or its corresponding data and further to a higher throttle opening side in accordance with the increase in the engine R.P.M. A hysteresis is set such that the range for switching the supercharger from OFF to ON is shifted to a higher throttle opening side than the range for switching the same from ON to OFF. The changing width of the ON-to-OFF range to the higher throttle opening side in accordance with the increase in the engine R.P.M. is set smaller than the hysteresis width within a predetermined gear stage range.

5 Claims, 3 Drawing Sheets

SUPERCHARGER CONTROL SYSTEM FOR ENGINES

BACKGROUND OF THE INVENTION

The present invention relates to a system for controlling a mechanical supercharger for an internal combustion engine to which is connected an automatic transmission.

The mechanical supercharger is driven by the engine to feed the cylinder forcibly with air or an air/ fuel mixture so that the engine output can be augmented by driving the supercharger. This supercharger is advantageous over the exhaust gas turbine in that it can effect the supercharging action even at a lower R.P.M. range and that it has a shorter turbo lag. The supercharger is driven when an increase in the engine output is demanded and when a smooth combustion is maintained even with more suction, because it is driven to increase the engine output especially by augmenting the suction. Generally in the prior art, therefore, the supercharger has its working range set on the basis of the engine load dictated by the throttle opening and the engine R.P.M. or its substitute vehicle speed, so that it is driven when the actual running state comes in that working range. Moreover, this working range is set to a lower throttle opening side when at a lower R.P.M., because a higher output is demanded, but to a higher throttle opening side according to the increase in the throttle opening when at a considerable or higher vehicle speed or engine N.P.M.

If, on the other hand, the range for switching the supercharger from ON to OFF and the range for switching it from OFF to ON are set identical, the supercharger is frequently turned ON/OFF by a slight change in the driving state such as the throttle opening or the engine R.P.M., to cause the so-called "hunting phenomenon". In the prior art, therefore, a hysteresis is set in the OFF-to-ON range and the ON-to-OFF range of the supercharger, and the boundary of the latter working range, i.e., the range for turning OFF the supercharger is set to a lower throttle opening side than that of the ON range. This technique for setting the hysteresis has been known in the art, as disclosed in Japanese Patent Laid-Open No. 195417/1987. In the invention, as disclosed in this Laid-Open, the hysteresis for controlling the ON/OFF of the supercharger at a higher gear ratio is set to have a small width.

As described above, the range for the supercharger to work is determined by using the throttle opening and the engine R.P.M. as its parameters. The supercharger is kept in its working state even if the actual throttle opening becomes smaller than that determining the working range but not over the hysteresis width. However, the working rage of the supercharger is set to the higher throttle opening side at a higher vehicle speed side, i.e., at a higher engine R.P.M. As a result, even the throttle opening within the supercharger working range at the lower R.P.M. side may go out of the working range at the higher R.P.M. side.

These situations are illustrated in FIGS. 3 and 4. In FIG. 3, a solid curve indicates the ON map of the supercharger at a predetermined gear stage set in an automatic transmission, and a broken curve indicates an OFF map of the same. This OFF map is set with a predetermined hysteresis (e.g., −5 degrees) with respect to the ON map. At tills gear stage, the (not-shown) accelerator pedal is depressed to augment the throttle opening, and the vehicle runs at a constant acceleration with the throttle opening being kept. The running state of this case is indicated by an arrow in FIG. 3. If, therefore, this running state changes to cross the OFF map, as indicated by the broken curve in FIG. 3, it comes into the OFF range of the supercharger so that the supercharger is interrupted at the instant across the OFF map.

As a result, even if the throttle opening makes no change, as shown in FIG. 4, the supercharger changes into its inoperative state at an instant to when the running state crosses the OFF map, to cause reductions of the engine torque and the acceleration and a temporary drop of the engine R.P.M. These changes occur when the driver makes no change in his maneuver so that shock and discomfort are felt by the driver.

SUMMARY OF THE INVENTION

An object of the present invention is to improve the accelerating performance with the throttle opening being kept constant.

Another object of the present invention is to prevent the supercharger from being turned OFF in the course of acceleration with the throttle opening being kept constant.

In order to achieve these objects, according to the present invention, the changing width of the OFF map of the supercharger within the range of a gear stage, at which the acceleration is done with the constant throttle opening, is set smaller than the width of the hysteresis. In the present invention, therefore, even if the vehicle speed increases while running with the constant throttle opening, the running state determined by using the vehicle speed as the parameter will not cross the OFF map within that gear stage range even if the vehicle speed increases. In short, the supercharger will not be suddenly turned OFF so that the accelerating performance can be kept at an excellent level.

The above and further objects and novel features of the present invention will more fully appear from the following detailed description when the same is read with reference to the accompanying drawings. It is to be expressly understood, however, that the drawings are for purpose of illustration only and are not intended as a definition of the limits of the invention.

DETAILED DESCRIPTION OF THE PREFERRED EMBODIMENT

Figure 1:
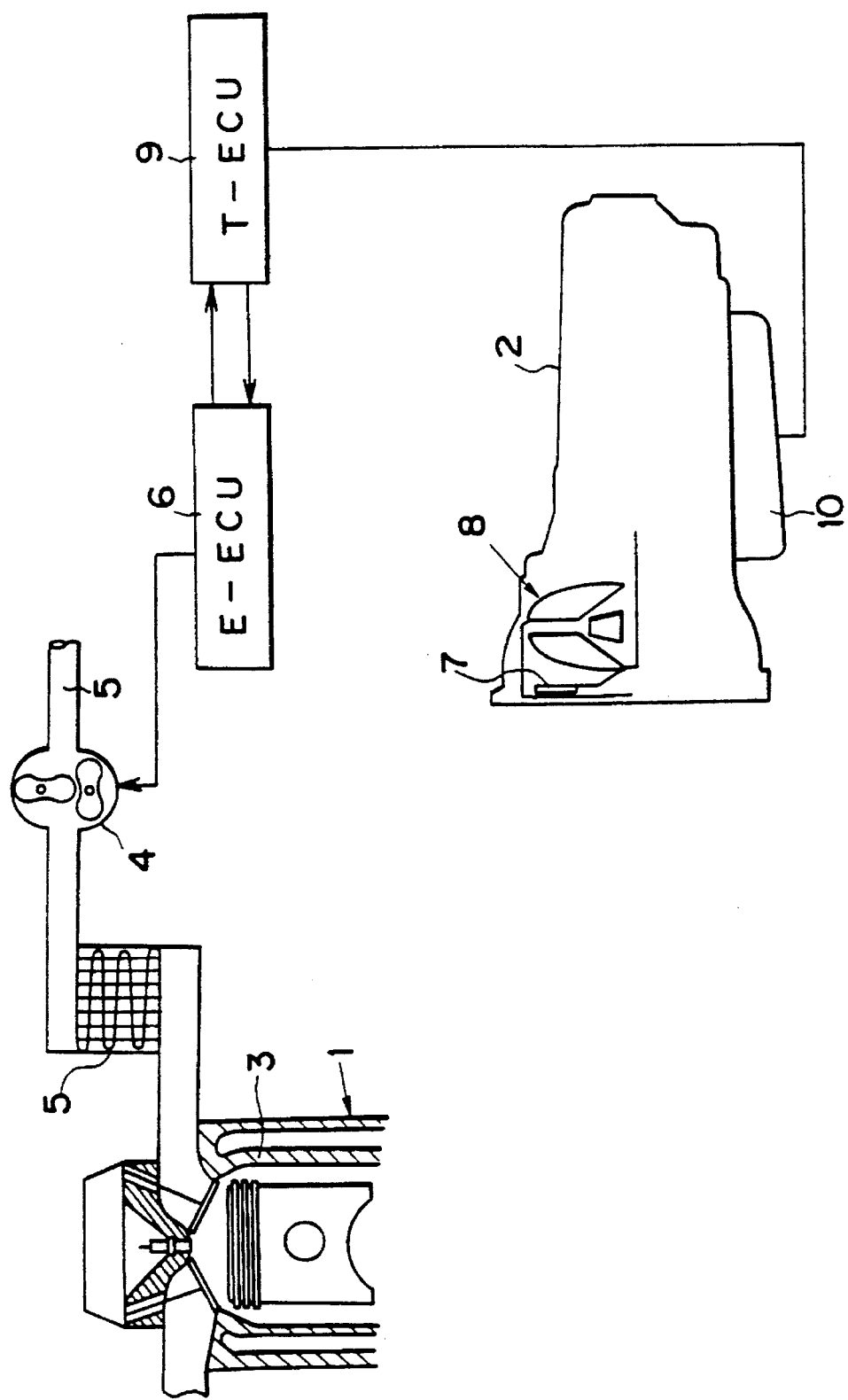
FIG. 1 is a block diagram schematically showing one embodiment of the present invention.

In FIG. 1, an automatic transmission 2 is connected to an engine 1. In an intake pipe connected to the intake port of the cylinder 3 of the engine 1, there is disposed a mechanical supercharger 4. This supercharger 4 is driven by the power of the engine 1 and is equipped with a (not-shown) solenoid clutch for making the supercharger 4 inoperative in a predetermined running state. The supercharger 4 can be exemplified by various types of blowers or compressors such as Roots type, screw type or vane type. Downstream of the supercharger 4, there is disposed an inter-cooler 5 for lowering the temperature of intake air.

In order to control the engine 1, there is provided an electronic control unit (E-ECU) 6. This control unit 6 is composed mainly of a central processing unit (CPU), memories (RAM, ROM) and input/output interfaces for controlling not only the fuel injection rate and the ignition timing but also the ON/OFF of the supercharger 4 on the basis of input data including the vehicle speed, the engine cooling water temperature, the accelerator opening and the exhaust catalyzer temperature.

On the other hand, the automatic transmission 2 has a construction similar to that used in the prior art such that the input coming from the engine 1 through a torque converter 8 having a lockup clutch 7 is accelerated/decelerated or reversed by the (not-shown) gear transmission composed of a plurality of planetary gear mechanisms until it is outputted. This automatic transmission 2 has its individual gear stages set on the basis of the running state dictated by the engine load and the vehicle speed and is equipped with an electronic control unit (T-ECU) 9 for controlling the automatic transmission 2. This control unit 9 is composed mainly of a central processing unit (CPU), memories (RAM, ROM) and input/output interfaces and is fed with the data including the vehicle speed and the accelerator opening, to decide the gear stage to be set, from the shift map having the accelerator opening and the vehicle speed as its parameters and the input data, and to output a shift signal to a hydraulic control system 10 so as to set that gear stage. Moreover, the electronic control unit 9 for the automatic transmission and the electronic control unit 6 for the engine are so interconnected that they can transmit the data to each other.

Since the supercharger 4 described above is operated in case the engine output is demanded to increase, its working range is set on the basis of the throttle opening and the engine R.P.M. This working range is prepared for each of the gear stages set by the automatic transmission and has such a general tendency that it is set to a lower throttle opening side for a lower engine R.P.M. and to a higher throttle opening side for a higher R.P.M. range. On the other hand, the range for turning OFF the supercharger 4 is set to a lower throttle opening side with a predetermined hysteresis so as to prevent the hunting phenomenon of the supercharger 4. Moreover, at a gear stage lower by one than the highest stage, e.g., at a specific gear stage to be used for an acceleration at the 3rd speed of a four-speed automatic transmission, the OFF map of the supercharger 4 is so set that the changing width to the higher throttle opening according to the increase in the engine R.P.M. may not exceed the width of the hysteresis.

Figure 2A:
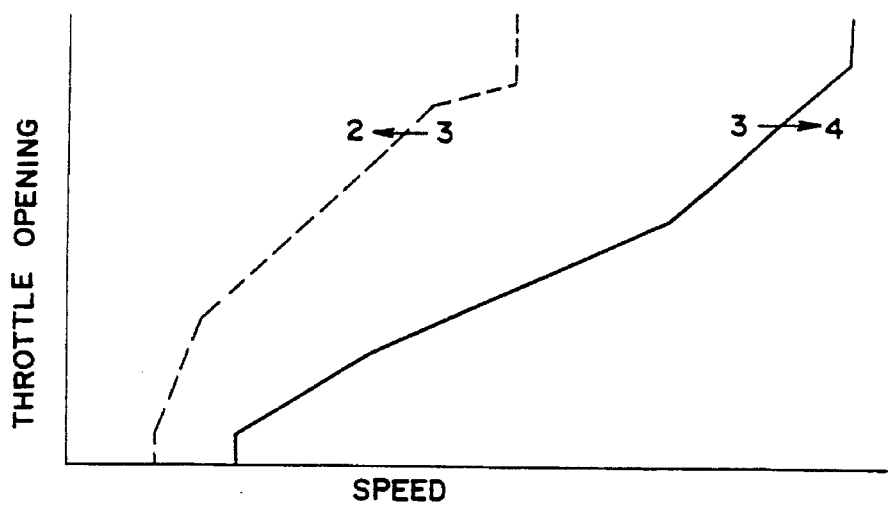
FIGS. 2A–2C presents a portion of a shift diagram, a portion of a supercharger ON/OFF map and a map superposing the former two.
Figure 2B:
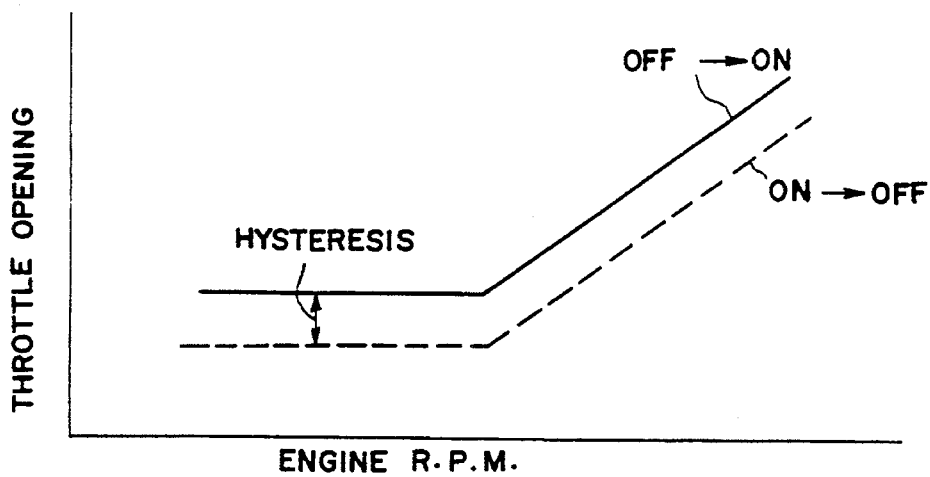

This setting will be specifically described in the following. FIG. 2(A) is a shift diagram for controlling the automatic transmission 2 and shows an upshift curve (as indicated by a solid line) from the 3rd to 4th speeds and a downshift curve (as indicated by a broken line). The automatic transmission 2 is held at the 3rd speed within the range defined by those curves. The working range of the supercharger 4 at the 3rd speed is illustrated in FIG. 2(B). Above the solid curve, there is located the so-called "ON range", in which the supercharger 4 is ON. Below the broken curve, there is located the OFF range, in which the supercharger 4 is OFF. Moreover, the zone between those solid and broken curves provides the hysteresis width. When the running condition changes to cross the broken curve from the higher to lower throttle opening sides or from the lower to higher engine R.P.M. sides, the supercharger 4 is switched from ON to OFF. The quantity of change of the broken curve in the range of a specific gear stage such as that for the 3rd speed, that is, the difference between the minimum and maximum of the throttle opening for the OFF map is set smaller than that hysteresis width.

Figure 2C:
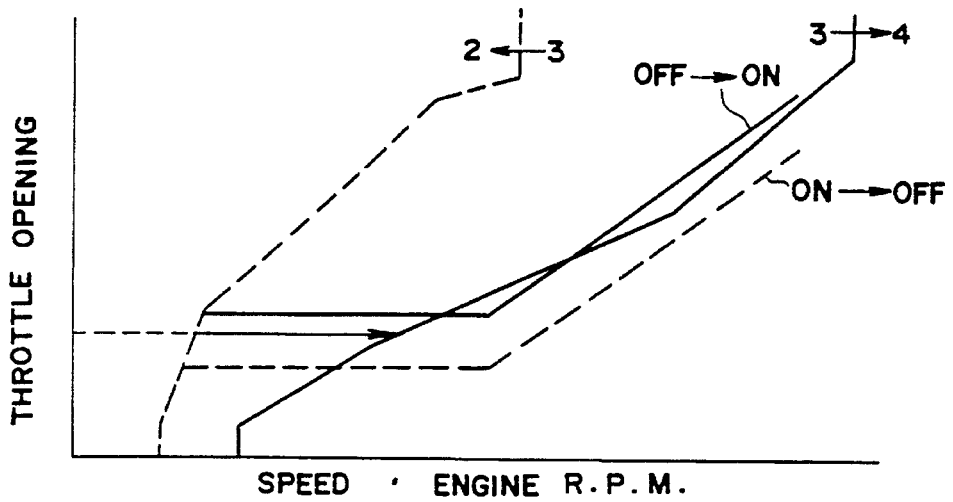
Figure 3:
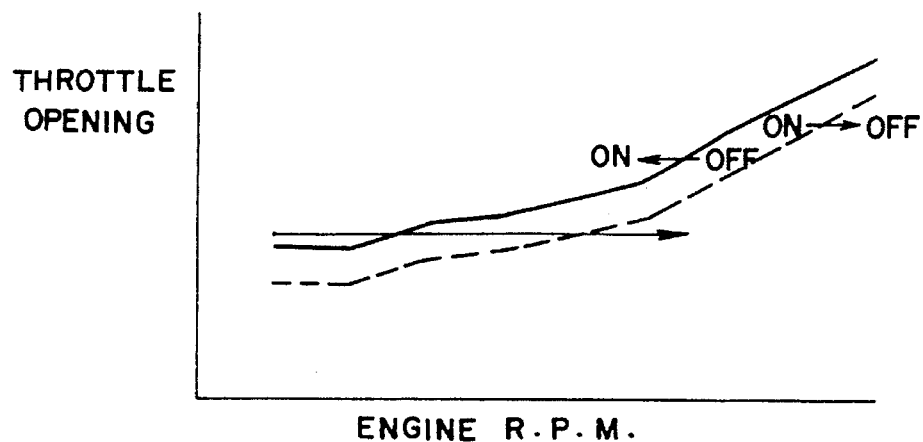
FIG. 3 is one example of the supercharger ON/OFF map of the prior art.
Figure 4:
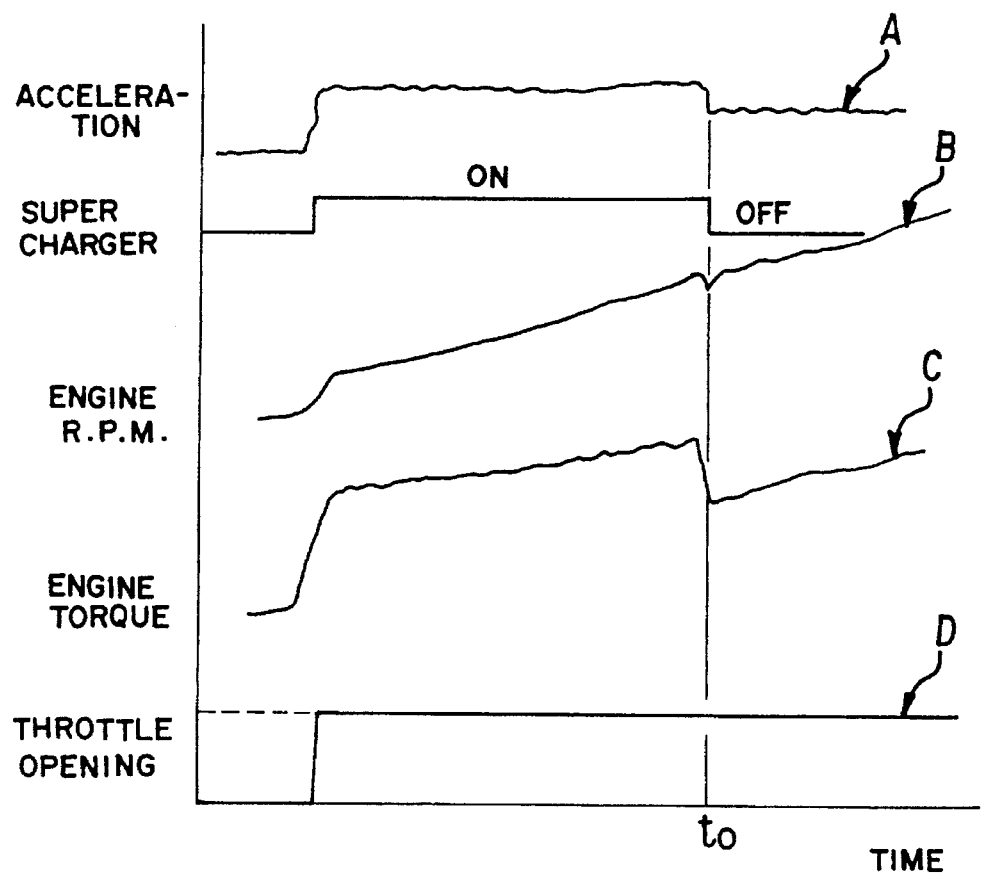
FIG. 4 is a time chart for explaining the situations, in which a shock is caused at an acceleration with a constant throttle opening by the control of the prior art.

The shift diagram described above is stored in the electronic control unit 9 for the automatic transmission, and the aforementioned map for controlling the supercharger 4 is stored in the electronic control unit 6 for the engine so that the automatic transmission 2 and the supercharger 4 are controlled according to each running state on the basis of those diagrams (or maps). FIG. 2(C) presents the shift map of FIG. 2(A) and the ON/OFF map of the supercharger 4 of FIG. 2(B) in a superposed manner. In the gear stage range of the 3rd speed, as is apparent from FIG. 2(C), the changing degree of the working range of the supercharger 4 to the higher throttle opening side against the increase in the engine R.P.M. is set to zero or smaller than the aforementioned hysteresis width.

In case, therefore, the vehicle runs with the throttle opening being kept at the value, as indicated at $\theta_1$ in FIG. 2(C), it is gradually accelerated to have its engine R.P.M. increased, unless the road is specially uphill. However, the 3rd speed state after the acceleration of the constant throttle opening $\theta_1$ will never cross the OFF map of the supercharger 4. As a result, the control system described above will never turn OFF the supercharger 4 in the course of acceleration if this accelerative run at the 3rd speed has a constant throttle opening, so that the accelerating performance can be prevented from being deteriorated.

Incidentally, although the foregoing embodiment has been described by taking up the 3rd speed as an example, the present invention should not be limited to thereto, but the control map of the supercharger may be set as above for another gear stage. Moreover, it may be limited to the range, which is expected to have an accelerative run with a constant throttle opening, that the changing width of the so-called "OFF map" for turning OFF the supercharger to the higher throttle opening side against the increase in the engine R.P.M. is smaller than the hysteresis width. Still moreover, the foregoing embodiment is exemplified by using the map, but this use of the map is intended to reduce the operational capacity demanded for the electronic control unit. In case a sufficient operational capacity is allowed, the electronic control unit may make direct operations without resorting to the map thereby to set the gear stages or to turn ON/OFF the supercharger.

Here will be synthetically described the advantages to be obtained by the present invention. According to the present invention, the supercharger is not turned OFF even if the vehicle is accelerated at a certain gear stage with the throttle opening being kept constant. As a result, a stable acceleration can be retained while preventing the shock which might otherwise be caused if the supercharger is switched against the intention of the driver, so that an excellent drivability can be attained.

What is claimed is:

1. A control system for a supercharger driven by an internal combustion engine with an automatic transmission, the automatic transmission having gear stages set according to a throttle opening and an engine R.P.M., wherein a range for turning ON the supercharger of the engine is set for each of the gear stages on the basis of a change in throttle opening in accordance with an increase in the engine R.P.M., and wherein a hysteresis is set such that a range for switching the supercharger from OFF to ON is shifted to a higher throttle opening than a range for switching the supercharger from ON to OFF, comprising:

means for setting a change in throttle opening of said ON-to-OFF range in accordance with the increase in the engine R.P.M. smaller than a change in throttle opening of the hysteresis within a predetermined gear stage range to maintain the supercharger ON within the predetermined gear stage range.

2. The control system according to claim 1, wherein said predetermined gear stage is lower by one gear stage than a highest gear stage.

3. The control system according to claim 1, wherein said predetermined gear stage is a 3rd forward speed.

4. The control system according to claim 3, wherein the change in throttle opening of said ON-to-OFF range in accordance with the increase in the engine R.P.M. is zero in the gear stage range of the 3rd forward speed.

5. The control system according to claim 1, further comprising:

means for storing said OFF-to-ON range and said ON-to-OFF range in maps.

\* \* \* \* \*